United States Patent [19]
Salgado et al.

[11] Patent Number: 6,112,039
[45] Date of Patent: Aug. 29, 2000

[54] AUDITING SYSTEM FOR A DIGITAL COPIER-PRINTER

[75] Inventors: David L. Salgado, Victor; Michael W. Barrett, Fairport; Jeffrey Gramowski, Webster; Thomas G. Lindsay, Penfield, all of N.Y.

[73] Assignee: Xerox Corporation, Stamford, Conn.

[21] Appl. No.: 09/418,235

[22] Filed: Oct. 14, 1999

[51] Int. Cl.[7] .................................................. G03G 15/00
[52] U.S. Cl. ................................... 399/79; 399/8; 399/43
[58] Field of Search .................................. 399/79, 1, 8, 9, 399/10, 43; 377/13, 15, 16; 235/375, 376, 377, 378

[56] References Cited

U.S. PATENT DOCUMENTS

| | | |
|---|---|---|
| 4,229,100 | 10/1980 | Travis .................................... 399/79 X |
| 4,313,673 | 2/1982 | Wartinger et al. ..................... 399/79 X |
| 5,034,770 | 7/1991 | O'Connell .................................. 399/79 |
| 5,825,988 | 10/1998 | Collard et al. ...................... 358/1.16 X |
| 5,825,991 | 10/1998 | Plakosh et al. .......................... 358/1.16 |
| 5,838,456 | 11/1998 | Wagi et al. .............................. 358/300 |

*Primary Examiner*—Sophia S. Chen
*Attorney, Agent, or Firm*—R. Hutter

[57] ABSTRACT

In a multifunction digital printing apparatus, such as a copier-printer, image data from print jobs are intermingled with image data from copy jobs, such as originating from a digital scanner. Further, scanner-only functions such as electronic filing and sending facsimiles can be performed without need for printing hardware. An auditing device can decrement a user's account on a per-sheet basis regardless of whether a requested job requires the use of the scanner or printing hardware or both.

8 Claims, 1 Drawing Sheet

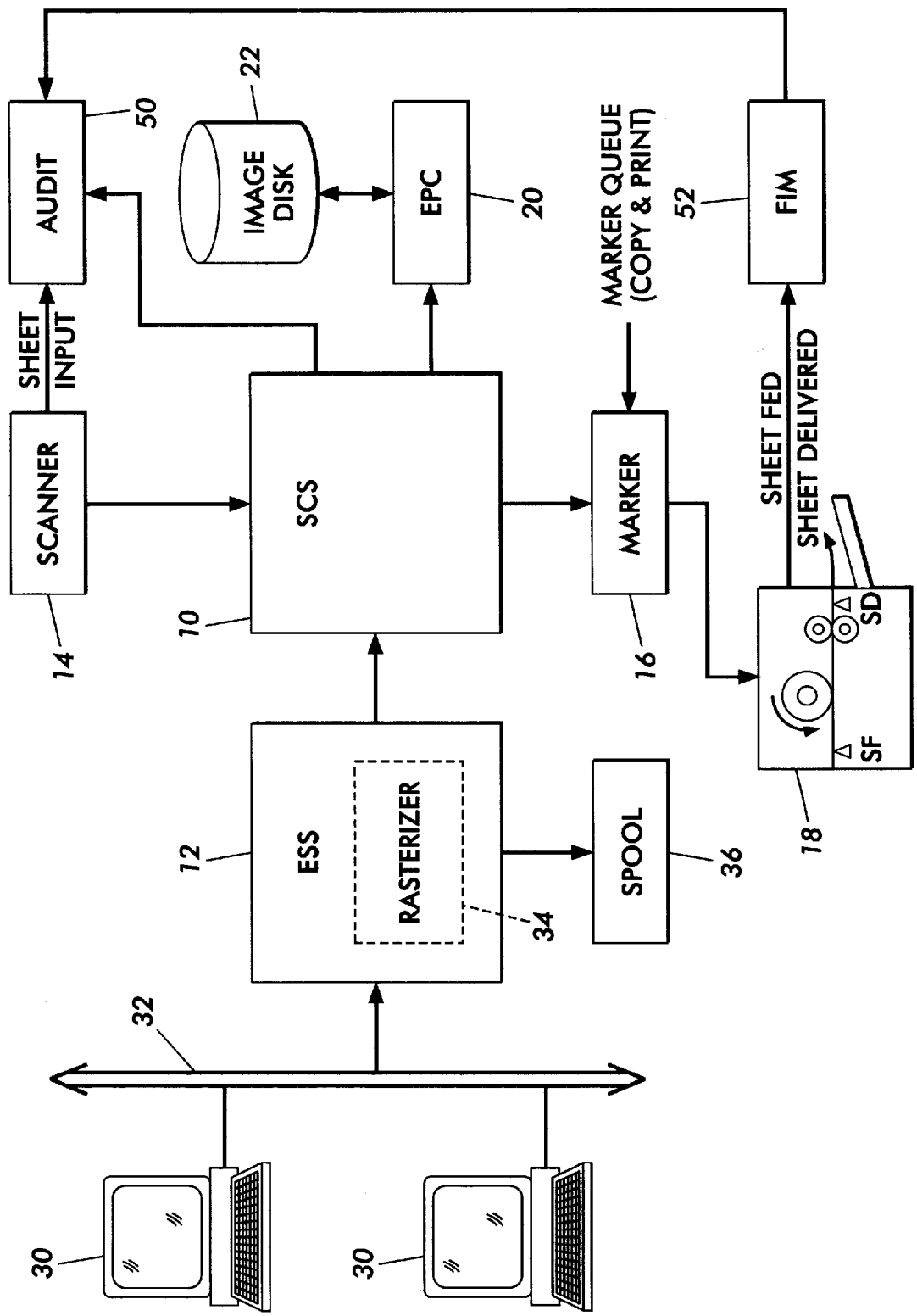

AUDITING SYSTEM FOR A DIGITAL COPIER-PRINTER

FIELD OF THE INVENTION

The present invention relates to a digital copier, or multifunction digital copier and printer, which can output prints based on either digital data received from a computer, or from image data derived from the scanning of a hard-copy original.

BACKGROUND OF THE INVENTION

A recent trend in the office-equipment industry is to provide "multi-function" devices, in which the functions of a copier and printer, and sometimes a facsimile machine and digital scanner as well, are combined in a unified architecture. In the basic case of a combined copier-printer, such a machine operates as a typical printer, in that digital image data, such as originating in a computer, can be submitted to the apparatus, and result in the output of print sheets based on the digital data. In addition, hard-copy originals can be placed in a document handler and then scanned, so that the images on the hard-copy originals are exposed onto one or more photosensitive chips (such as a CCD) to yield a quantity of digital image data. This digital image data based on the scanned hard-copy originals can then be submitted to the same printing hardware at which the print jobs are output. Thus, in a copier-printer, a single set of printing hardware is shared by a printing apparatus and a copier. If a facsimile function is added, incoming faxes are printed on the same printing hardware, and the digital scanner can be used for scanning outgoing faxes.

In one common architecture for a copier-printer, the control system governing the copier functions is distinct from the control system covering the printer functions. Typically, but not necessarily, there will be in a single architecture one CPU dedicated to distinctly printer functions, and another dedicated to copier functions Among the functions performed by the printer CPU are functions relating to what can generally be called "rasterizing" original image data. By "rasterizing" is typically meant decomposing original image data which is in a page description language, such as a Adobe® PostScript™ or PCL; rasterization can also include interpreting data which is originally in TIFF, ASCII, or a facsimile format. The result of this rasterization, regardless of the format of original data, is a set of image data which is largely directly operative of printing hardware, such as binary data compressed according to a relatively simple algorithm.

Further, in such a two-CPU architecture, the copier functions are largely controlled by a copier CPU. The copier CPU accepts data from the hard-copy scanner. As the image data from the scanner was never originally in a page description language or other format, the rasterizing functions of the printer CPU are irrelevant to the copying process. Within the copier-printer, individual page images are temporarily retained in a memory until a particular moment in which the image data needs to be submitted to the printing hardware. Once the image data is rasterized and ready to be submitted to the hardware, it is immaterial whether the rasterized image data originated as a "print job" or a "copy job."

One practical advantage of the copier-printer architecture is that the scanner associated with the copier portion of the architecture can be used not only to directly submit image dated to the printer hardware for copying, but can also be used for other purposes. For example, the input scanner can be used by itself as an input scanner for a facsimile apparatus; in this case, hard-copy original input at the input scanner will in effect cause a set of printing hardware at another apparatus, over phone lines, to print out the image. Other uses of the input scanner include a "scan-to-file" function, in which, instead of having the image data immediately used for making a copy, retaining the image data in a computer for an indefinite period of time. Once in a computer, the scanned-in data can be converted (such as through a optical character recognition program) into a searchable text format. In a highly-networked system, the original image can be scanned in at one copier-printer and (simultaneously, or at some time in the future) printed out at many different remote copier-printers. In short, the copier-printer architecture enables the input scanning and output printing functions to be disassociated in both space and time.

Many of the business opportunities afforded by the copier-printer architecture can be exploited in what can be called a "copy shop environment" which includes not only retail copy shops but public or university libraries. In the copy-shop environment it is typical to charge retail users for individual "uses" of a machine. In the context of analog copiers, in which a scanned or exposed input necessarily implies an output print, auditing or otherwise making payment for copy-shop functions was straightforward. In a digital, copier-printer context, because the input scanning and output printing functions are not immediately related, it becomes more complicated to facilitate charging and paying for the various scanning and printing functions available to a retail user. The present invention is directed toward an auditing system which enables monitoring of both input scanning and output printing with a digital copier-printer in a copy-shop environment.

DESCRIPTION OF THE PRIOR ART

U.S. Pat. No. 5,825,991 shows the basic elements of a high-volume digital print server, in which the outputs of a plurality of interpreters are retained in a common image pool and in turn submitted to printing hardware by a buffer manager.

SUMMARY OF THE INVENTION

According to the present invention, there is provided a document processing apparatus, comprising a scanner, for exposing an image on an original sheet and converting the image on the original sheet to digital data. The scanner emits a signal when an original sheet is scanned. Printing hardware is further provided, for making a print sheet having an image thereon, the image being based on digital data. The printing hardware emitting a signal when a print sheet is output. Auditing means use a signal from at least one of the scanner and the printing hardware to decrement an account associated with a user.

BRIEF DESCRIPTION OF THE DRAWING

The FIGURE is a systems view showing the essential elements of a multi function copier-printer, in which the present invention is operative.

DETAILED DESCRIPTION OF THE INVENTION

The FIGURE is a simplified diagram showing the essential elements of a copier-printer architecture on which the method of the present invention is operated. According to this illustrated embodiment of the present invention, a copier-printer includes a software control system (SCS) 10 and an electronic sub-system (ESS) 12. The SCS 10, which preferably includes a CPU, such as a microprocessor, exerts control over much of the hardware in the copier-printer. The SCS 10 can accept image data, based on hard-copy originals, from a scanner 14 and can submit image data to what is called a "marker" 16. In this particular embodiment, the marker 16 is the software which is immediately operative of printing hardware such as indicated by 18. The hardware 18 can include, for instance, ink-jet or xerographic printing apparatus: what is important is that page image data submitted to marker 16 causes the marker 16 to operate the hardware 18 to output images based on the page image data (such as by controlling an ink-jet print head or modulating a laser) according to image data.

Also associated with SCS 10, in the illustrated embodiment is an "electronic pre-collation" memory, or EPC, 20. The EPC 20 is a memory in which page image data, that is, data associated with individual pages of a multi-page print or copying job, is retained so that the page images can be submitted to the marker 16 and hardware 18 at precisely the correct moment within the context of the printing process (e.g., so that the image of page 5 of a print or copy job immediately follows the image of page 4 of the job). There may further be included, associated with SCS 10, what is here called an "image disk" 22 in which rasterized image data associated with various print and copy jobs can be retained on a longer-term basis until the marker 16 is ready to accept them. The image disk 22 will of course fill up during periods of high demand, print and/or copy jobs must wait in queue for output by the marker 16 and hardware 18: in a typical embodiment of marker 16, marker 16 controls a "marker queue" of intermingled print and copy jobs.

Turning now to electronic subsystem (ESS) 12, this ESS 12 includes many of the features familiar from other known types of digital printing. The ESS 12 accepts print jobs from any number of computers such as 30 over a network 32. Typically, the jobs received over network 32 will be in a page description language such as Adobe PostScript or PCL, or else in some other original format such as TIFF or ASCII. If there exists a facsimile device on network 32, facsimile data in a facsimile format can in effect form a print job to be output by hardware 18. In order to process various print jobs received over network 32 ESS 12 includes what is here generally referred to as a "rasterizer" 34. As used herein, a rasterizer is basically a set of software which converts is data in an original format (a page description language or otherwise) and converts it into a form which is generally immediately operative of printing hardware such as 18. In effect, the output format should be a format in which data can be immediately submitted to marker 16, although in practical terms this is usually a binary set of page image data which has been compressed in a straightforward manner. The rasterizer 34 can include one or more page description language interpreters and/or software for converting TIFF, ASCII, or facsimile data. Also associated with ESS 12 is a spool 36 which is a buffer memory for retaining print jobs, in their original format, prior to rasterization.

In a preferred embodiment of the present invention, SCS 10 and ESS 12 are respectively controlled by individual, dedicated CPU's such as microprocessors. The output of ESS 12 is a set of decomposed page images which are ready to be submitted to marker 16; however, since the functions of SCS 10 typically supersede the functions of the ESS 12, the SCS 10 will either submit page image data to marker 16 immediately, retain the page images in EPC 20, or, during periods of heavy use of the system, cause decomposed page images from ESS 12 to be retained, on a job-by-job basis, in image disk 22 until marker 16 is ready to cause hardware 18 to print out a particular job.

It should be noted that, irrespective of the activities of ESS 12, the SCS 10, in combination with scanner 14 and marker 16, can be designed to function independently as a digital copier. In such a case, original image data from scanner 14 is eventually submitted to marker 16 for printing hardware 18. Typically, the copy jobs originating from scanner 14 are at some point intermixed with print jobs which originate from ESS 12 and page image data from both copy jobs and print jobs can be queued together in image disk 22.

With particular reference to the present invention, there is provided, in conjunction with the basic elements of a multifunction reprographic apparatus as shown, what is here generally called an "audit system" 50. The audit system 50 is a device which facilitates counting of sheets fed through a scanner 14 or through the hardware 18, thus providing a direct physical count of sheets which are successfully scanned through scanner 14 or output by hardware 18. The audit system 50 also generally interacts with the SCS 10, or other system which generally controls both the input scanning and marking systems within a particular apparatus.

In general, the audit system 50 determines how much credit a particular user has to expend on a particular function of the apparatus; typically this is done by calculating a price for a requested job and comparing the price to an amount of credit assigned to the user requesting a job just before the job is executed. As such, the audit system 50 can include, or otherwise have access to, a currency input such as a coin or bill slot, a credit or debit card input, or some equivalent account system if the population of users is within an internal expense-reporting system. The audit system 50 can debit amounts from various user accounts as different functions are performed by the apparatus according to the user's request. Thus, if a user requests fifty print sheets associated with a particular job, in a particular embodiment of the invention, the audit system 50 will, before processing of each image of the job, determine that the particular user requesting the job has enough credit to pay for the output image. When the job is executed, the audit system 50 will decrement the user's credit as sheets are scanned through scanner 14 or output by printing hardware 18; preferably, the decrement will occur only as each sheet is successfully scanned or output.

Depending on a particular job to be performed, counts of activities of scanner 14 or hardware 18 will or will not be relevant to determining the price of a requested job and the monitoring of whether the job was successfully executed. For example, for a standard printing job, in which image data originates on a computer 30, because the scanner 14 will not be used, only a count from the hardware 18 will be relevant. If there is a copying job, the activities of scanner 14 and hardware 18 will need to be monitored, because a copying operation involves both scanning of originals and output of copies. In a scan-to-file or outgoing facsimile job, only the activities of scanner 14 are relevant.

According to a preferred embodiment of the present invention, audit system 50 will monitor the activities of either of the scanner 14 or hardware 18 depending on the nature of a requested job. If the user requests only a scan-tofile or outgoing facsimile job, audit system 50 will monitor the activities of scanner 14 only. In a print job or incoming-facsimile job, because the activities of only hardware 18 are relevant, the audit system 50 will monitor the activities of hardware system 18 only. For a copying job both the functions of the scanner 14 and hardware 18 are relevant, although it may be desirable, according to a particular business model, to ignore the price of scanning in a copy job.

In addition to debiting a user's account, or determining whether a user has enough credit to perform a required job, the physical monitoring of scanner 14 and hardware 18 can be used to check whether a certain requested activity has been successfully completed. If the initial request from a user is to print out thirty sheets, the audit system 50 can not only determine that the user can pay or has paid for a required job, but further can determine that, in response to the job request, exactly thirty sheet-feed pulses came out of hardware 18, before the SCS 10 considered the job completed. If fewer than thirty pulses were detected by audit system 50, this can be taken as an indication that there has been a hardware failure of some sort. With particular regard to copying jobs, the audit system can determine both that the originals were successfully scanned in (by accounting the sheet-feed pulses from scanner 14) but also that the requested number of copies or output by hardware 18. Thus, if the user requests three copies of a ten-page document, the audit system 50 can readily calculate that successful output of a job would require thirty sheet-feed pulses from hardware 18. If the number of sheet-feed pulses from either scanner 14 or hardware 18 was not what was expected from the time of job request, the audit system 50 can credit the user for sheets that were not successfully input or output. However, according to a particular business model, it may be desirable to credit the user the price of the entire requested job in the case of certain types of failure.

It should be noted that the general principle of the present invention can be generally adapted to more sophisticated types of sheet counting, particularly in regard to hardware 18. In a preferred embodiment of the present invention, both scanner 14 and hardware 18 can provide in effect two counts of sheets scanned or output if one particular sheet is duplexed (that is, scanned or printed on both sides thereof). Further, if hardware 18 is capable of printing on both standard paper and heavier cover stock, a requested job could require for instance 10 pages of regular stock plus two sheets of cover stock: in such a case, there could be different types of sheet-feed pulses associated with the regular stock and the cover stock, respectively, and audit system 50 would be able to detect that all of the necessary regular stock and the two sheets of cover stock were successfully fed for each set in a job.

In the case of types of jobs in which only the scanner functions 14 are relevant, such as scan-to-file, or outgoing fax, a "track output" method is performed by audit system 50. When the "track output" method is selected, the scanner 14 emits to audit system 50 a sheet-feed pulse every time a page image is outputted. For a scan-to-file job, an image is counted as outputted when the system has successfully stored it to a desired server location on network 32. For an outgoing facsimile job, an image is outputted when the system has successfully transmitted the fax image to, for instance, a fax server (not shown) on network 32, or alternately if the fax server has successfully sent the fax to the destination. Once again, outputting a page images from scanner 14 is enabled only as long as audit system 50 determines that a particular user has enough credit to perform the required job. If the user runs out of credit, the audit system 50 disables the scanner 14 and image transfer stops. Once the audit system 50 is re-enabled by the addition of more credit, image transfer resumes.

According to a preferred embodiment of the prevent invention, the audit system 50 is designed to ensure that only successfully scanned or fed sheets are monitored. With particular reference to the printing hardware 18 (although the principle can apply to scanner 14 as well), there is provided a first sheet detector ("sheet fed" or SF, as shown in the FIGURE) at an early point in the paper path, such as near the stack from which original sheets are drawn for printing thereon, and a second, "sheet delivered" sensor SD, which is preferably disposed downstream of the hardware 18, which would detect that a sheet has successfully passed through the hardware 18. The physical design of the detectors, which indicate the presence of a sheet at a particular location within hardware 18, can be of any standard configuration known in the art. If the hardware 18 is working correctly, hardware 18 emits a "sheet-delivered" signal from detector SD within 1500 milliseconds of the "sheet-fed" signal from detector SF. If there is not a "sheet delivered" signal emitted from hardware 18 within 2000 milliseconds of a "sheet-fed" signal, a jam or purge has probably occurred within hardware 18.

Further according to this preferred embodiment, there is provided what is here called a "foreign interface monitor," or FIM. The FIM is shown as a separate element 52 in the FIGURE, but its essential function can be integrated with the audit system 50. FIM 52 is basically a hardware or software device which reconciles the various "sheet fed" and "sheet delivered" signals from hardware 18 and determines, for audit system 50, that a particular sheet has been successfully fed and delivered. Prior to the feed of each sheet within hardware 18, the FIM 52 emits the sheet-fed signal to the audit system 50 and increments a "credited sheet" counter. When the hardware 18 notifies the FIM 52 of a sheet delivered (by a signal from the SD detector within a certain time window after a signal from the SF detector), the FIM 52 decrements the "credited sheet" counter. The "credited sheet" counter within FIM 52 thus maintains the number of sheets that have been charged to the user but not successfully delivered. To avoid double charging once the jam has been successfully cleared, FIM 52 does not emit a pulse for the next "credited sheet" value after clearing. In this way, the system credits the user for unsuccessfully marked sheets.

The functions of FIM 52 can be selectively disabled or enabled by a systems administrator, depending on the particular business model under which the machine is operating. Also, a systems administrator can have the option of deciding on a payment or auditing policy for various functions of the apparatus: for instance, it may be desirable for print jobs to be paid for and decremented per sheet output, while copy jobs could be decremented by sheets scanned and/or by sheets output, or based on some formula derived from sheets scanned and sheets output. Similarly, there may be a different per-sheet price assigned to scanning sheets for an outgoing facsimile and scanning sheets for scan-to-file. Scanning or output may be priced by a fixed amount for any number of sheets scanned or output up to a certain number, with a per-sheet price after the certain number. Preferably, the systems administrator will have available a full set of pricing options for both scanning and outputting sheets for various machine functions.

What is claimed is:

1. A document processing apparatus, comprising:

a scanner, for exposing an original image on an original sheet and converting the original image on the original sheet to digital data, the scanner emitting a signal when the original sheet is scanned;

printing hardware, for making a print sheet having a printed image thereon, the printed image being based on digital data, the printing hardware emitting a signal when the print sheet is output;

at least one of the scanner and the printing hardware including a sheet-fed detector and a sheet-delivered detector disposed along a sheet path therein, and wherein the sheet-fed detector emits a sheet-fed signal when the print sheet is fed into the at least one of the scanner and the printing hardware and the sheet-delivered detector emits a sheet-delivered signal when a sheet is delivered out of the at least one of the scanner and the printing hardware;

auditing means for using a signal from at least one of the scanner and the printing hardware to decrement an account associated with a user; and a monitor, receptive to sheet-fed and sheet-delivered signals from at least one of the scanner and the printing hardware, the monitor determining that the sheet-delivered signal has occurred within a predetermined time window following the sheet-fed signal.

2. The apparatus of claim 1, the monitor causing a value of a sheet to be credited to the user if the sheet-delivered signal has not occurred within the predetermined time window following the sheet-fed signal.

3. The apparatus of claim 1, the monitor maintaining a count of sheet-fed signals which have not been followed by a corresponding sheet-delivered signal within the predetermined time window.

4. The apparatus of claim 1, the auditing means determining a price of a requested job based on at least one of a number of original sheets that must be scanned by the scanner and a number of print sheets that must be output by the printing hardware.

5. The apparatus of claim 1, wherein the printing hardware is capable of printing images on both sides of a sheet, and the printing hardware emits a signal when an image on either side of a print sheet is output.

6. A document processing apparatus, comprising:

a scanner, for exposing an original image on an original sheet and converting the original image on the original sheet to digital data, the scanner emitting a signal when the original sheet is scanned;

printing hardware, for making a print sheet having a printed image thereon, the printed image being based on digital data, the printing hardware emitting a signal when the print sheet is output;

auditing means for using a signal from at least one of the scanner and the printing hardware to decrement an account associated with a user; and means for sending digital data from the scanner to a memory;

wherein the auditing means decrements a user's credit when an image from a sheet scanned by the scanner is determined to be successfully sent to the memory.

7. The apparatus of claim 6, wherein the scanner is capable of exposing images on both sides of a sheet, and the scanner emits a signal when an image on either side of the sheet is scanned.

8. A document processing apparatus, comprising:

a scanner, for exposing an original image on an original sheet and converting the original image on the original sheet to digital data, the scanner emitting a signal when the original sheet is scanned;

printing hardware, for making a print sheet having a printed image thereon, the printed image being based on digital data, the printing hardware emitting a signal when the print sheet is output;

auditing means for using a signal from at least one of the scanner and the printing hardware to decrement an account associated with a user; and means for sending digital data from the scanner to a facsimile;

wherein the auditing means decrements a user's credit when an image from a sheet scanned by the scanner is determined to be successfully sent to the facsimile.

* * * * *